(12) United States Patent
Jarisch et al.

(10) Patent No.: US 8,336,447 B2
(45) Date of Patent: *Dec. 25, 2012

(54) EXTRACTION MODULE WITH LINEAR CLOSURE FOR THE PRESSURISED PREPARATION OF A DRINK FROM A CAPSULE

(75) Inventors: Christian Jarisch, Romanshorn (CH); Alfred Yoakim, St-Legier-La Chiesaz (CH)

(73) Assignee: Nestec S.A., Vevey (CH)

( * ) Notice: Subject to any disclaimer, the term of this patent is extended or adjusted under 35 U.S.C. 154(b) by 809 days.

This patent is subject to a terminal disclaimer.

(21) Appl. No.: 12/486,478

(22) Filed: Jun. 17, 2009

(65) Prior Publication Data

US 2009/0255410 A1    Oct. 15, 2009

Related U.S. Application Data

(63) Continuation of application No. 10/544,014, filed as application No. PCT/EP2004/000498 on Jan. 22, 2004, now Pat. No. 7,562,618.

(30) Foreign Application Priority Data

Feb. 7, 2003  (EP) .................................... 03002817

(51) Int. Cl.
*A47J 31/40* (2006.01)
(52) U.S. Cl. ........................ 99/289 R; 99/295; 99/302 P
(58) Field of Classification Search .................... 99/295, 99/289 R, 302 P, 302 R, 297, 303
See application file for complete search history.

(56) References Cited

U.S. PATENT DOCUMENTS

| 4,852,472 | A | 8/1989 | In-Albon et al. |
| 5,755,149 | A | 5/1998 | Blanc et al. |
| 5,776,527 | A | 7/1998 | Blanc |
| 6,182,554 | B1 | 2/2001 | Beaulieu et al. |

FOREIGN PATENT DOCUMENTS

| EP | 0512142 | 8/1991 |
| EP | 1090574 | 4/2001 |
| EP | 1121882 | 8/2001 |
| WO | WO 95/17121 | 6/1995 |
| WO | WO 98/47418 | 10/1998 |
| WO | WO 00/44868 | 8/2000 |
| WO | WO 00/38558 | 11/2000 |
| WO | WO 01/30218 | 5/2001 |

*Primary Examiner* — Reginald L Alexander
(74) *Attorney, Agent, or Firm* — K&L Gates LLP (57) ABSTRACT

The invention relates to an extraction module with linear closure for the pressurized preparation of a drink from a capsule, containing a substance for extraction, comprising means for extraction with a first extraction sub-assembly and a second mobile extraction sub-assembly closing against the first sub-assembly such as to form an extraction chamber in the closed position and to provide sufficient space between the two sub-assemblies for introduction of a capsule between the sub-assemblies in the open position and comprising a means for fixing and positioning the capsule between the two sub-assemblies. Said means for fixing and positioning may be displaced in a coaxial manner with relation to the linear displacement of the mobile extraction sub-assembly and is capable of being displaced linearly by the second mobile sub-assembly in to a displaced position such as to permit a closing of the two sub-assemblies around the capsule.

19 Claims, 7 Drawing Sheets

EXTRACTION MODULE WITH LINEAR CLOSURE FOR THE PRESSURISED PREPARATION OF A DRINK FROM A CAPSULE

CROSS REFERENCE TO RELATED APPLICATIONS

This application is a continuation of the U.S. application Ser. No. 10/544,014, filed Jul. 29, 2005, now U.S. Pat. No. 7,562,618, which is a continuation of the International application PCT/EP04/000498, filed Jan. 22, 2004 the content of which is expressly incorporated herein by reference thereto.

FIELD

The present invention relates to the preparation of beverages using the principle of extracting a substance contained in a refill, known as a "capsule", by passing a flow of water through it under pressure. The invention relates more specifically to an extraction module for a machine for preparing beverages, such as a coffee machine.

BACKGROUND

It is prior art to prepare beverages such as coffee, tea or hot chocolate from capsules containing a predetermined serving of a substance to be extracted. The capsule format has the advantage of facilitating the operations of preparing the drink, ensuring clean preparation without leaving visible traces of the substance, and controlling the reproducibility and quality of the prepared product.

The principle of extracting from a capsule generally consists in (i) enclosing the capsule in a pressure-resistant chamber, (ii) piercing one of the faces of the capsule, (iii) introducing a quantity of hot water into the capsule to create a closed pressurized environment to produce the liquid coffee or other extract, (iv) releasing the liquid extract through the opposite face of the capsule, and (v) collecting the extract in a container of suitable capacity, such as a cup.

The problem of loading the capsule into the extraction system and removing it therefrom has already been the subject of a number of patent publications.

Patent application EP 1 090 574 A1 relates to an extraction device comprising a pair of jaws with a fixed jaw part and a movable jaw part, the latter being articulated to and moved over the fixed part, and a closing lever mechanism with a plurality of arms is associated therewith to close the movable part over the fixed part.

In published document WO 01/30218 A1, the principle is similar but a mechanism for ejecting the capsule is additionally provided, associated with a pulling arm of the movable jaw so as to detach the capsule from the bottom of the extraction chamber when the jaw is reopened.

Based on these principles, it is obvious that a closure device with two parts, one fixed and one movable, optionally associated with an ejector, is known. However, these devices are essentially manual closure devices and are not very suitable for automating the closure function. It should also be noted that because of the movement of the axes of articulation, such systems must be designed and assembled with precision so as to avoid clearances and problems in fitting the parts together.

Patent application WO 95/17121 relates to a device comprising an assembly formed of a fixed piston and a movable cylindrical body, the assembly being placed facing a boiler. Between the boiler, on the one hand, and the fixed piston and cylindrical body, on the other hand, is a zone containing the means for receiving, holding in position and ejecting the packages. The holding means and the reception means are different means. The former are not entirely retractable and are placed directly between the boiler and the cylindrical body to hold the side edges of the package, and the latter are retractable and placed on one side of the cylindrical body to simply stop the package in opposition to the force of gravity. Such a device is complex since it uses various parts to simultaneously hold and correctly centre the capsule (or package) in position in the extraction chamber. This involves several separate mechanisms for moving the means in order to close the extraction system. The offset position of the holding means can also give rise to problems of jamming or premature wear. Furthermore, such a device is also relatively bulky because of the peripheral position of the holding means and of the boiler.

Patent application WO 98/47418 relates to a method for converting an espresso machine operating in vertical extraction with pre-measured tablets used in a horizontal plane into an espresso machine operating in horizontal extraction with pre-measured tablets which can be used in a vertical plane. The machine has reception and ejection means consisting of a single retractable component which can be moved underneath the extraction member using an electromechanical manoeuvring means that is separate from the means for actuating the extraction member.

Patent application WO 00/38558 relates to an extraction chamber for an automatic machine composed of two movable parts in a horizontal plane, one of which is supplied with hot water, the other having a filter, the two parts being mounted so as to pivot vertically one opposite the other along their transverse axis.

Patent application WO 00/44868 relates to an extraction device comprising an extraction chamber composed of two parts that can move horizontally so that they can be moved towards or away from each other, the parts being mounted on an eccentric shaft that can transmit to them pivoting movements in opposite directions, the device comprising a pivot link braked between each eccentric shaft and each moving part so as to combine a horizontal movement and a pivoting movement for linking together the steps of opening and closing the extraction chamber.

SUMMARY

The object of the present invention is to propose an extraction device that facilitates the insertion, correct positioning and ejection of a capsule whilst overcoming the drawbacks of the devices of the prior art.

In this regard, the invention relates to a module for extraction, under pressure, for the preparation of a beverage from a capsule containing a substance to be extracted, comprising:
extraction means comprising a first extraction sub-assembly and a second extraction sub-assembly that can move in closure against the first sub-assembly so as to form, in the closed position, an extraction chamber enclosing the capsule in a closure plane, and so as, in the open position, to maintain a sufficient space between the two sub-assemblies to allow the capsule to be inserted between the two sub-assemblies,
a means for holding and positioning the capsule between the two sub-assemblies, partially closing the opening space to hold the capsule between the two sub-assemblies; characterized in that the holding and positioning means can be moved coaxially to the linear displacement of the movable extraction sub-assembly and can be pushed back linearly by the second, movable sub-assembly into a retracted position, allowing the two sub-assemblies to close around the capsule.

Thus, unlike known prior-art devices, alignment along one and the same displacement axis increases the reliability of the device by preventing jamming and also reduces the overall size of the device. The first sub-assembly may comprise a base on which the holding and positioning means may be mounted and guided slidingly so as to move along this base.

Preferably, the holding and positioning means is in the form of a single component able to centre the capsule in the opening space along several axes in the closure plane.

Thus, the functions of holding and positioning along several directional axes are performed by a single component, making the device simpler, more reliable and more compact.

The capsule can be held and centred correctly along several directions in the closure plane by means of, for example, a holding and positioning means having an open cylindrical portion for holding and centring the capsule and an annular guiding portion mounted around the base of the extraction sub-assembly.

In a preferred embodiment, capsule ejection means are provided for ejecting the capsule out of the module. As the capsule is fairly wet and pressed firmly against the surfaces of the extraction means owing to the effect of pressure, the ejection means detach the capsule after each extraction. The ejection means also help expel the capsule even when the module is only slightly inclined with respect to the horizontal.

Preferably, the ejection means for ejecting the capsule are operated, during opening, by the linear return action of the second, movable sub-assembly as it disengages from the first extraction sub-assembly. This configuration also helps simplify the system.

More specifically, the holding and positioning means is locked, in the retracted position, when the extraction sub-assemblies are closed and is unlocked, in the holding position, only after the capsule has been ejected by the ejection means. The unlocking of the holding and positioning means in the retracted position can be achieved directly by the linear return action of the movable extraction sub-assembly as it disengages. The holding and positioning means can then return to the holding position under the return effect of an elastic means, such as one or more return springs or any other equivalent means.

By linking the actuation of unlocking of the holding and positioning means to the ejection of the capsule, reliable sequential and controlled automatic functioning is achieved, ensuring that the capsule is ejected when there is a sufficient space between the extraction sub-assemblies and before the holding and positioning means returns to the position for holding a fresh capsule.

The ejection means may be activated in various ways. In a preferred example, the ejection means are elastically tensioned when the two extraction sub-assemblies are closed and freed from their elastic tension to cause ejection when the two sub-assemblies are reopened. The advantage of such an arrangement is that it links ejection to the opening of the extraction sub-assemblies without requiring the use of a separate mechanism for causing ejection or for electrically or electronically commanding opening. For example, the ejection means can consist of a lever in the form of a ring, articulated to the fixed extraction sub-assembly. The lever can be tensioned through contact with at least one leaf spring or any other equivalent means borne by the holding and positioning means.

The movable extraction sub-assembly preferably has linear actuation means, preferably of the piston type, which can be activated in closure by hydraulic or electric means.

In a preferred embodiment, the first extraction sub-assembly is fixed. It comprises a capsule reception zone equipped with relief elements for opening the capsule. The second, movable sub-assembly comprises a complementary capsule reception zone and means for supplying water to the capsule.

Additional features and advantages are described herein, and will be apparent from, the following Detailed Description and the figures.

DETAILED DESCRIPTION

With reference to FIGS. 1 to 5, the extraction module 1 comprises extraction means for receiving a capsule 12 and extracting a liquid extract from it by passing water under pressure through the capsule. The extraction means have a first sub-assembly 10, which is preferably fixed, and a second sub-assembly 11, which is preferably movable and which cooperates in closure with the sub-assembly 10. The sub-assemblies 10, 11 each have a reception zone, 2 and 5 respectively, so as each to receive one face of the capsule when closed. The reception zone of the first sub-assembly 10 has capsule opening elements 22, generally relief elements such as a plurality of pyramidal regions forming part of a pressure distribution plate 21.

Figure 4:
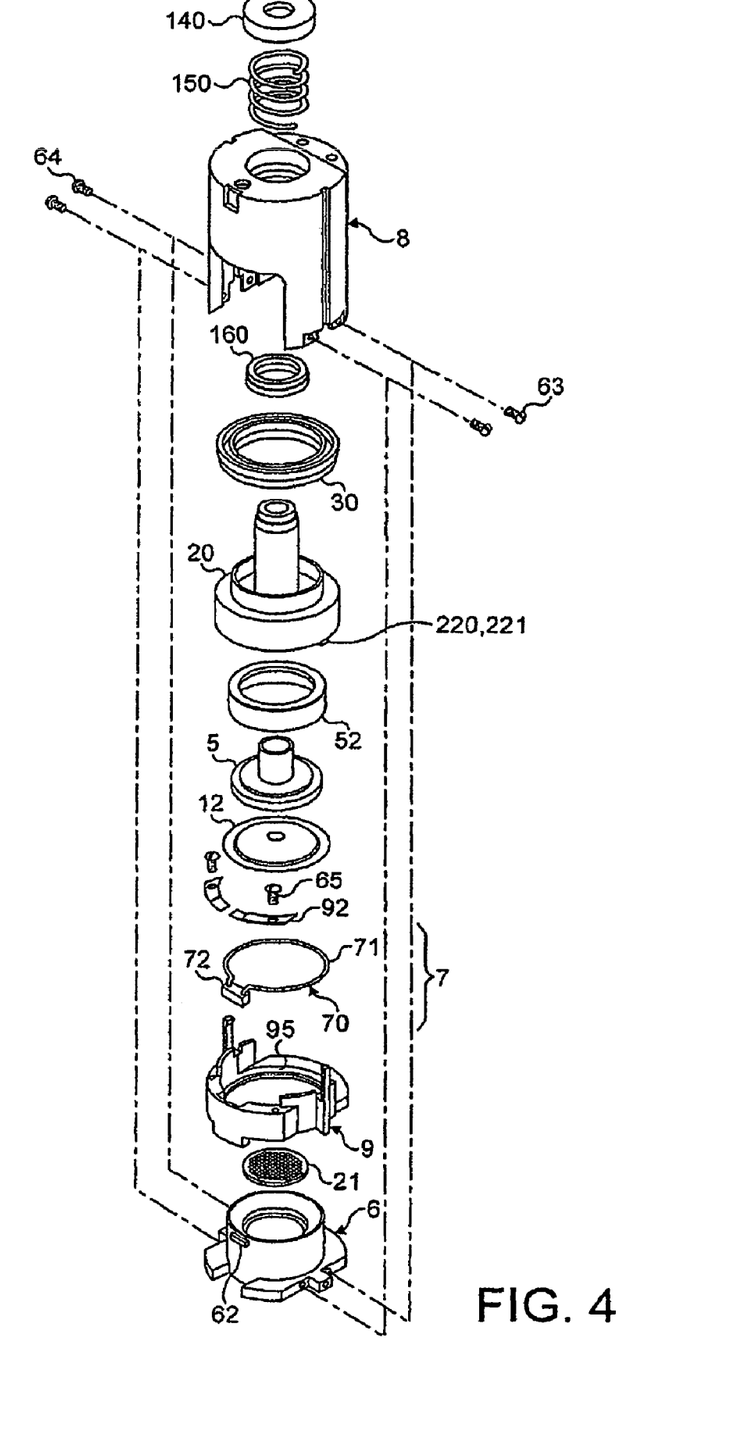
FIG. 4 is an exploded perspective view of the module according to the invention.

The fixed sub-assembly 10 has a base or trunk 6 through which a flow channel 60 passes to allow the liquid extract to flow out of the extraction chamber. The base 6 is fastened to a main body 8, at the sides for example, as illustrated in FIG. 4. The body 8 and the base 6 delimit an internal space 14 with an insertion side comprising a slot 15 and an ejection side comprising an exit aperture 16 for the capsule.

The body also comprises a central bore 80 for the passage of a piston 20 forming part of the movable extraction sub-assembly. The piston is mounted through the bore 80 of the body and is connected integrally with an extraction spray device 5 comprising a reception zone with piercing elements 50 for opening the capsule. The piston 20 and the spray device 5 are assembled coaxially as a single piece and have a water intake channel 51 arranged so as to dispense water through the spray device 5.

The piston is mounted elastically through the body against a compression spring 150 placed between a ring 140 fixed to the end of the piston and a housing in the body. Sealing between the piston and the inside of the body is achieved using seals 30, 160 placed on either side of an annular baffle formed between the piston and the inside of the body. Between them, the two seals 30, 160 thus delimit a pressure chamber 81 that can expand under the effect of a hydraulic fluid entering the chamber, supplied through a fluid intake 82 located at the top of the body (FIG. 3).

It will therefore be understood that the movable sub-assembly essentially composed of the piston 20 and the spray device 5 is held in the position in which the extraction chamber is open, i.e. distanced from the reception zone of the fixed sub-assembly, owing to the compression exerted by the spring 150 that acts between the ring 140 of the piston and the body 8. In this way, by passing hydraulic fluid into the pressure chamber 81, the spring is compressed so as to push the piston and spray device as a single piece in the closure direction F1.

Figure 1:
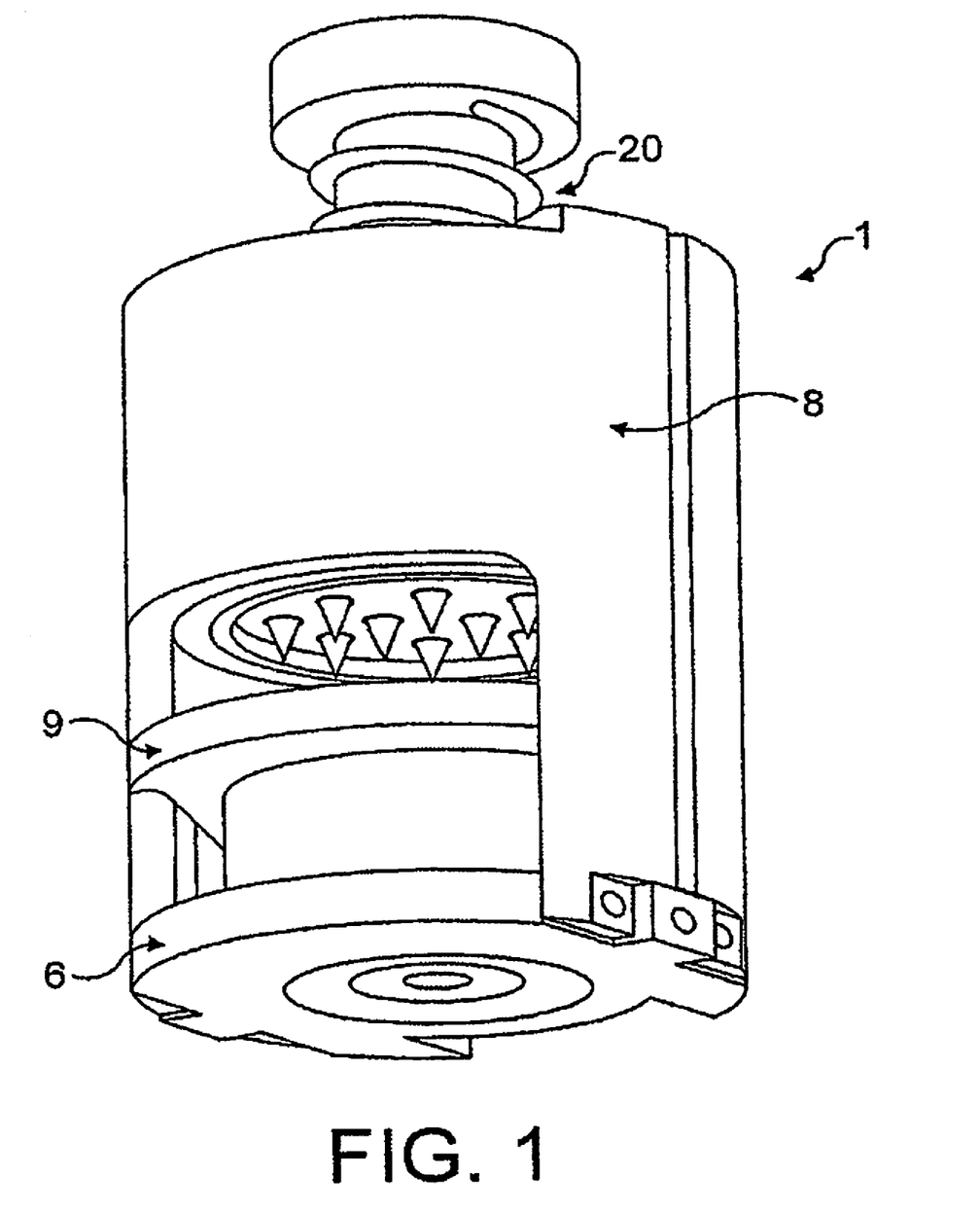
FIG. 1 is an overall perspective view of the module according to the invention in a capsule insertion configuration.
Figure 2:
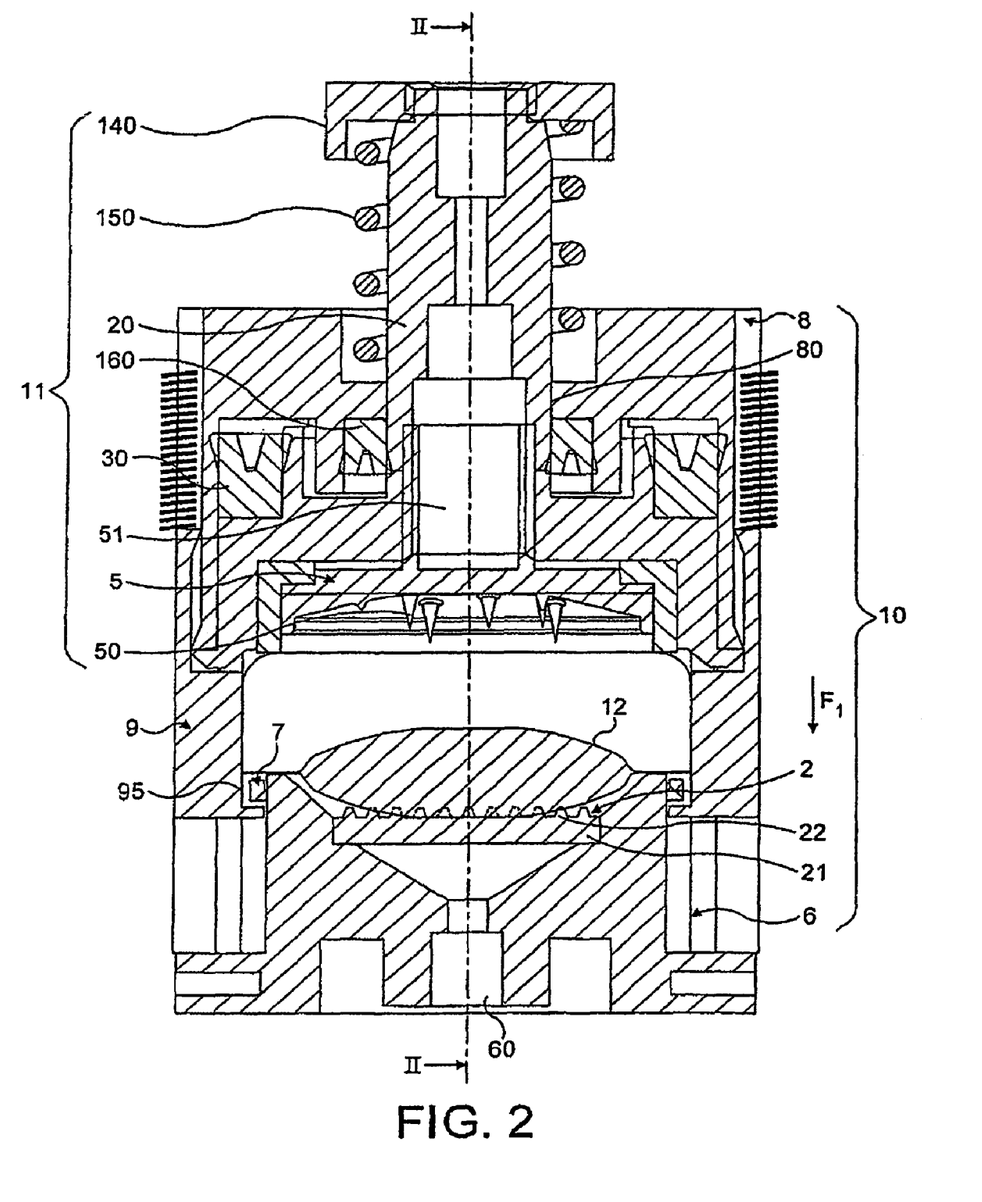
FIG. 2 is a view in section on I-I of FIG. 1 in the same configuration with a capsule held in place.
Figure 3:
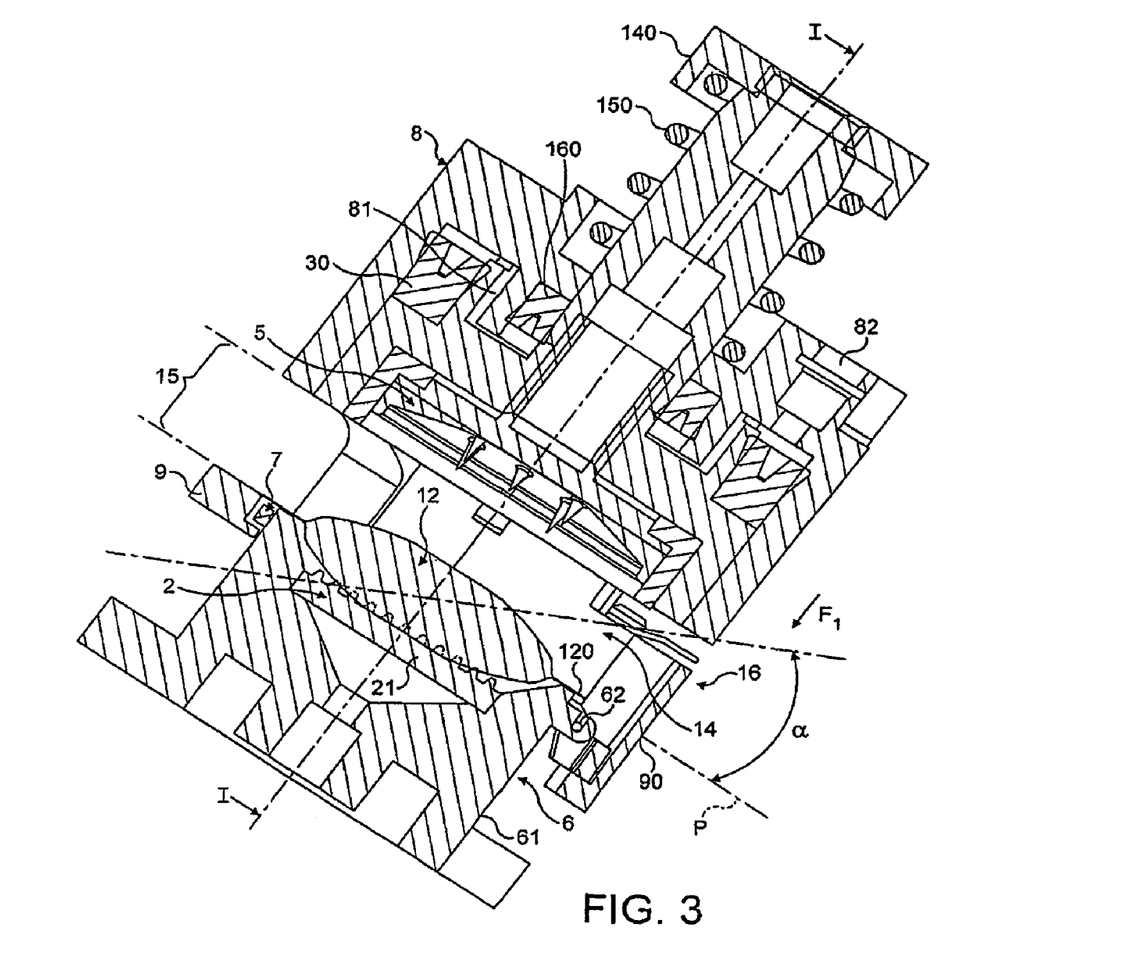
FIG. 3 is a view in section on II-II of FIG. 2 in an inclined capsule insertion configuration.

In the open configuration of FIGS. 1 to 3, a sufficient space 14 is maintained between the two opposite reception zones 2, 5 to allow a capsule 12 to be inserted through the slot 15. The capsule can be inserted through the slot 15 manually, by the user himself, or by semi-automatic or automatic loading means which are not described in the present application.

Figure 7:
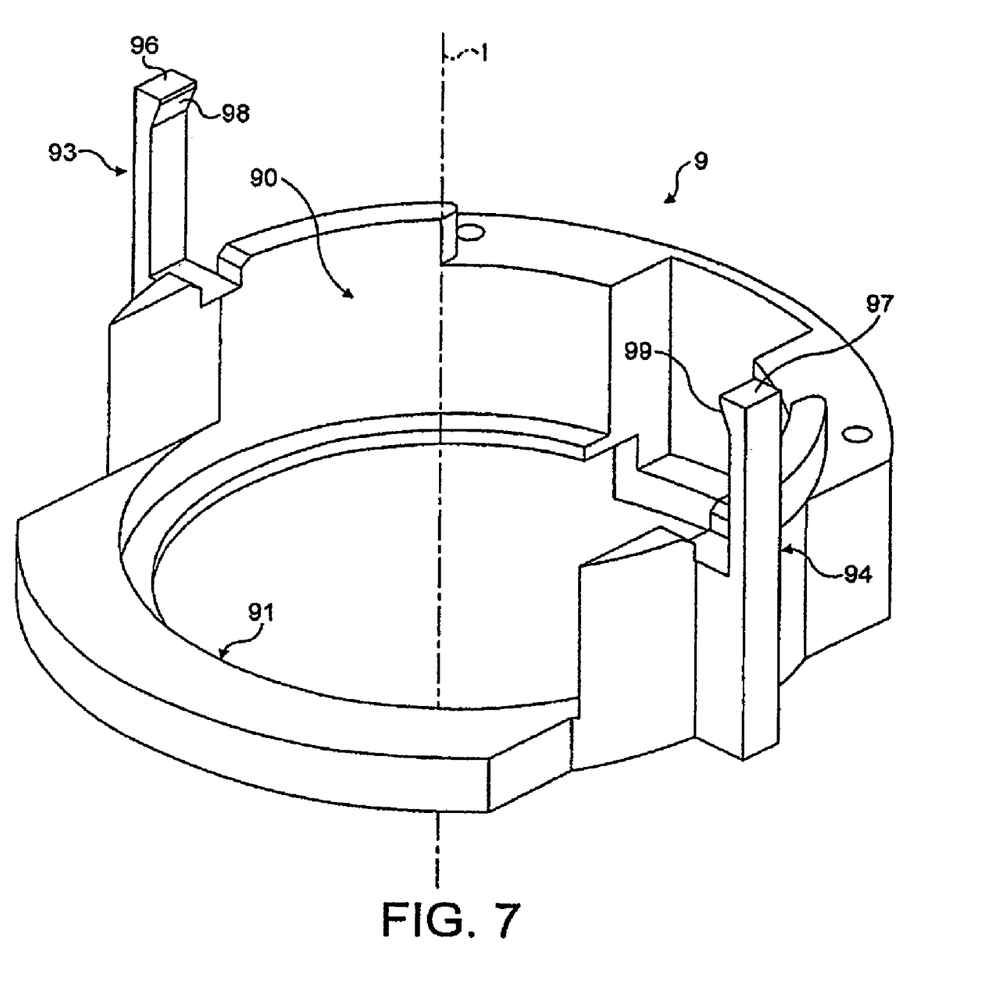
FIG. 7 is a detail view of the holding and positioning means of the module of the invention.

According to the invention, a holding and positioning component 9 is provided between the movable sub-assembly 11 and the fixed sub-assembly 10 to hold the capsule in place in the closure plane P of the module. The holding and positioning component 9 is arranged so as to immobilize the capsule along several directional axes by means of a partially open partially cylindrical portion 90, more particularly visible in FIG. 7. The component also has an annular guiding portion 91 mounted around the base 6 of the fixed extraction sub-assembly. The guiding portion 91, together with an ejection means 7, preferably in the shape of an annulus (described in detail later on in the present description), serves as a holding shoulder for holding the edges of the capsule. As shown in FIG. 3, when inserted, the edges of the capsule are also held by the upper rim of the base 6 on which sealing is achieved when the spray device descends. On each side of the component, the component is extended along the body 8 by two fingers 93, 94 which engage in guiding grooves 83, 84 of the body. These fingers are connected to the upper end of the grooves by elastic return springs 85 keeping, when the module is open, the holding and positioning component 9 in a holding position, i.e. in a position in which the cylindrical portion 90 partially closes off the space 14, in particular the exit aperture 16 and the edges in a direction perpendicular to the direction of said aperture.

The cylindrical portion 90 of the component is positioned so as to partially surround the zone 2 for receiving the capsule. Preferably, the portion 90 comes close to the periphery of the reception zone and is of a shape that geometrically complements the edges 120 of the capsule, preferably extending over a circumference of between 100 and 180 degrees, so as to hold the capsule along several directional axes and ensure the capsule is centred. The portion closes off part of the space 14, preferably, so as to be centred on the side opposite the slot 15. The component 9 is thus mounted coaxially around the base 6, along an axis I, with respect to the linear displacement of the means for actuating the movable sub-assembly, i.e. the piston 20 and the spray device 5.

The component 9 can be moved along a cylindrical portion 61 of the base between a holding position and a retracted position allowing the extraction sub-assemblies to be closed around the capsule. In the configuration of FIGS. 1 and 2, the component 9 is in the position for holding and positioning the capsule under the action of the return springs 85 which keep the component at the top of the cylindrical portion 61 of the base.

The extraction module also has a capsule ejection mechanism 7 for helping to detach the capsule after extraction and eject it out of the module. The capsule ejection function should in fact work reliably for an unlimited number of extraction cycles without it being necessary to manually remove a capsule which has become wedged or stuck in the system. The ejection mechanism is provided to raise the capsule and detach it from the surface of the reception zone 2. During extraction, the capsule is subjected to considerable internal pressure owing to the build-up of water in the capsule enclosure. The capsule is opened by tearing the material in contact with the relief elements of the pressure distribution plate. Thus, following extraction, the surface of the capsule is "stamped" with the reliefs of the pressure distribution plate and force must be applied from the reception zone surface outwards to detach the capsule and eject it.

The ejection mechanism is designed to be elastically tensioned when the two extraction sub-assemblies are closed and to be free of this tension so as to cause ejection when the two sub-assemblies are reopened. For this purpose, the ejection mechanism 7 consists of a lever comprising a ring portion 71 and an end 72 articulated to an articulation pin 62 on the base 6 of the fixed extraction sub-assembly. The diameter of the ring portion of the lever is substantially larger than the reception zone 2 to allow the extraction module to close, but this diameter is smaller than the diameter of the edges of the capsule so as to be able to engage with the edges and detach the capsule. Preferably, the lever 70 is housed, in the rest position, in a recess 95 formed in the holding and positioning component 9. To trigger the lever into the ejection position, the holding and positioning component has elastic elements 92, in the form of leaves fixed to the rim of the component 9, which cooperate with the end 72 of the lever. The free parts of the elastic elements 92 extend above the recess 95 so as to be able to come into contact with the end of the lever, which has the effect of raising the ring portion during ejection.

As shown in FIGS. 2 and 4, a mechanism is provided for locking the holding and positioning component 9 in the retracted position, in order to keep the component 9 retracted during ejection of the capsule by the ejection means. The locking mechanism has two abutment surfaces 96, 97 positioned at the end of the fingers 93, 94 of the component. The surfaces 96, 97 cooperate in locking with two studs 86, 87 housed in the guiding grooves 83, 84 of the body when the component 9 is lowered along the base of the fixed extraction sub-assembly.

Finally, a mechanism is also provided for unlocking the holding and positioning component 9, allowing the latter to return to its initial holding and positioning position of FIGS. 1 and 2. This mechanism comprises studs 98, 99 inside the fingers of the component 9, designed to be activated by hooks 220, 221 positioned on the periphery of the piston when the piston rises.

The principle of operation of the extraction module will now be explained to facilitate understanding of the steps of insertion, closure, opening and ejection of the capsule.

FIG. 3 shows the module with the extraction sub-assemblies in the open position. The module is preferably inclined with respect to the horizontal so as to facilitate insertion of the capsule and ejection thereof by taking advantage of the force of gravity. The inclination may vary between 5 and 90 degrees, preferably between 20 and 80 degrees. Under the effect of the compression spring 150, the piston is held in the retracted position to create a sufficient space 14. The holding and centring component 9 is engaged in the position for holding and positioning a capsule by virtue of the return springs 85. A capsule may therefore be inserted through the slot 15. When a capsule is inserted, the edges 120 of the capsule come into abutment against the portion of complementary shape 90 of the component, thus centring the capsule in the middle of the extraction zone. The capsule therefore rests freely on the reception zone 2 against the pressure distribution plate 21.

Figure 5:
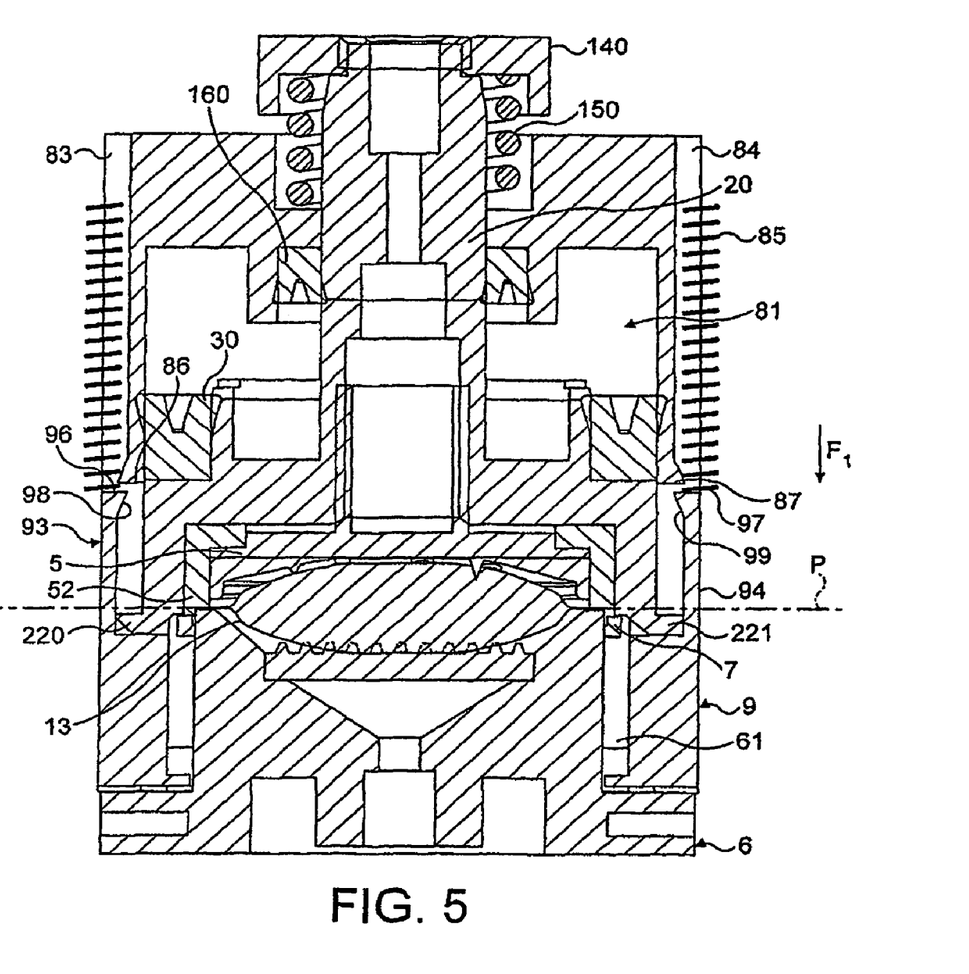
FIG. 5 is a view in section on I-I of FIG. 1 but in the configuration in which the module is closed around a capsule.

FIG. 5 shows the step of closing the module. The piston 20 is activated by the introduction of a hydraulic fluid into the pressure chamber 81. The piston drives the spray device 5 so that it closes against the capsule in the direction F1. As the piston descends, the holding and positioning component 9 is pushed back by the lower edges of the piston until the component is in a retracted position at the bottom of the base 6. At the end of closure, the moving sub-assembly tensions the ejection mechanism 7. Specifically, the seal 52 of the spray device holds the lever 70 in the folded position whilst the elastic elements of the component 9 are subjected to elastic bending owing to the relative movement of the component 9 with respect to the end 72 of the lever. When the component 9 descends, the end, which is fixed, forces the moving leaves 92 to bend, thus tensioning the ejection mechanism.

When the module is closed, the component 9 is then automatically locked in the retracted position by the locking mechanism. More precisely, the abutment surfaces 96, 97 of the fingers of the component 9 then cooperate against the abutment surfaces 86, 87 of the body, thus immobilizing and locking the component 9.

The extraction operation, which consists in extracting the liquid extract under hot water pressure, is known per se and does not need to be explained in the present application.

Figure 6:
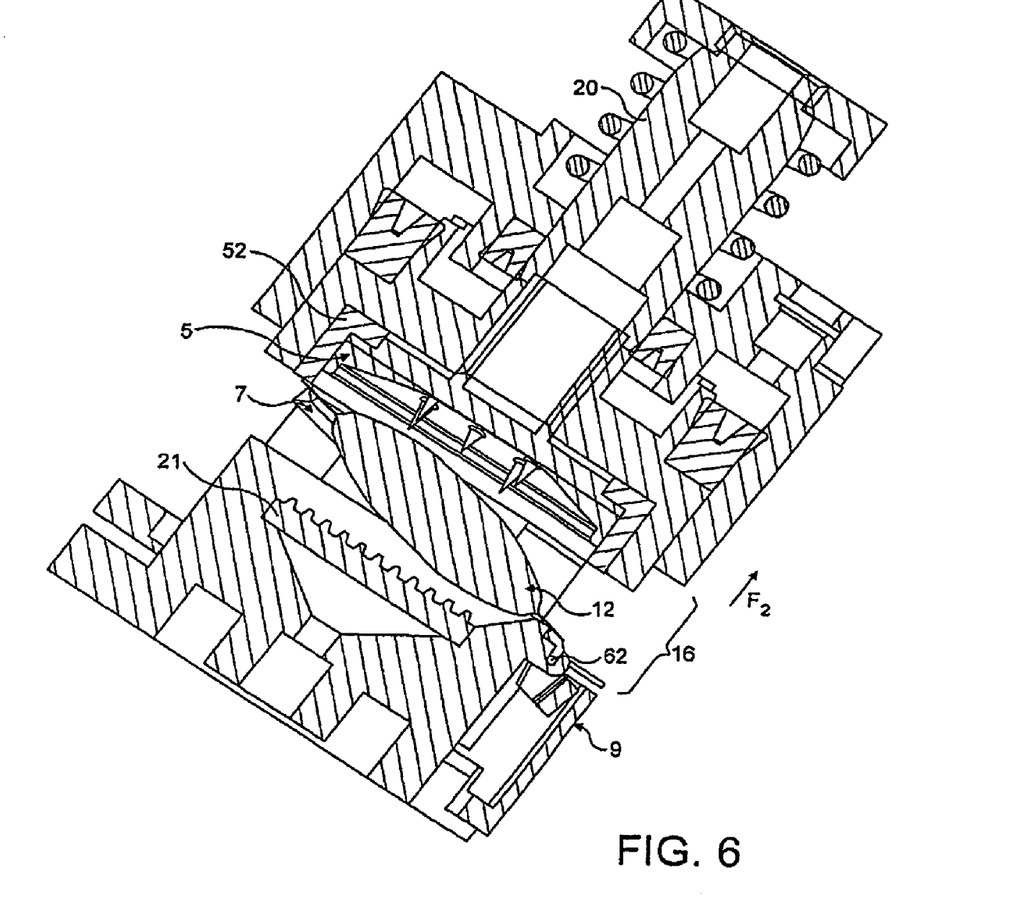
FIG. 6 is a view in section on II-II of FIG. 1 but in a capsule ejection configuration.

FIG. 6 shows the reopening and ejection step. Reopening is commanded by the piston 20 and the spray device 5 rising in the direction F2. The component 9 is still locked by the above-described locking mechanism, whilst the rise of the piston gradually frees the ejection mechanism 7 by releasing the tension created in the leaves during closure. The lever of the ejection mechanism then pivots about the articulation pin 62, thus detaching the capsule and inclining it further with respect to the vertical on the side of the exit aperture 16. The capsule can then fall under gravity into a container for empty capsules (not shown). The action of the ejection mechanism is concomitant with the rise of the piston. At the end of travel of the piston, the component 9 is then freed by the hooks 220, 221 of the piston, which act on the studs 98, 99, moving the fingers 93, 94 away and disengaging the abutment surfaces. The component 9 is then returned to the holding and positioning position by the return springs 84, 85.

The invention relates to an extraction module that can be installed in a beverage dispenser or machine using any type of pre-measured capsule. A dispenser or machine may contain one or more modules, depending on the required capacity. The module of the invention offers loading/extraction/ejection cycles that are more reliable and faster than those commonly available.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. Module for the preparation of a beverage from a capsule comprising:
 a first extraction sub-assembly and a second extraction sub-assembly that can move against the first sub-assembly so as to form, in a closed position, an extraction chamber for enclosing the capsule in a closure plane and, in an open position, maintain an opening space between the two sub-assemblies to allow the capsule to be inserted between the two sub-assemblies, an assembly for holding and positioning the capsule between the two sub-assemblies, the assembly comprising a single component able to hold the capsule in a centered position in the opening space along several axis in the closure plane and being mounted coaxially relative to the second, movable sub-assembly, displaceable linearly along the same axis as the second, movable sub-assembly, and capable of being pushed back by the second, movable sub-assembly into a retracted position, allowing the two sub-assemblies to close around the capsule.

2. Extraction module for extraction, under pressure, for the preparation of a beverage from a capsule containing a substance to be extracted, comprising:
 extraction means comprising a first extraction sub-assembly comprising a base and a second extraction sub-assembly that can move against the first sub-assembly so as to form, in a closed position, an extraction chamber enclosing the capsule in a closure plane, and so as, in an open position, to maintain an opening space between the two sub-assemblies to allow the capsule to be inserted between the two sub-assemblies,
 a means for holding and positioning the capsule, the holding and positioning means capable of being pushed back linearly by the second movable sub-assembly, mounted coaxially relative to the second movable sub-assembly, displaceable linearly along the same axis as the second movable sub-assembly, and configured between the two sub-assemblies when the capsule is inserted so as to partially close the opening space to hold the capsule between the two sub-assemblies even when the module is in an inclined position;
 the holding and positioning means mounted around the base of the first sub-assembly so as to be capable of being pushed back into a retracted position for allowing the two sub-assemblies to close around the capsule, the holding and positioning means comprising a single component able to hold the capsule in a centered position in the opening space along several axis in the closure plane.

3. Extraction module according to claim 2, wherein the holding and positioning means has an open cylindrical portion for holding and centering the capsule and an annular guiding portion mounted around the base of the extraction sub-assembly.

4. Extraction module according to claim 2, comprising capsule ejection means for ejecting the capsule out of the module.

5. Extraction module according to claim 4, wherein the ejection means for ejecting the capsule are operated, during opening, by the linear return action of the second, movable sub-assembly as it disengages from the first extraction sub-assembly.

6. Extraction module according to claim 4, wherein the holding and positioning means is locked, in the retracted position, when the extraction sub-assemblies are closed and is unlocked, in the holding position, only after the capsule has been ejected by the ejection means.

7. Extraction module according to claim 4, wherein the unlocking of the holding and positioning means in the retracted position is achieved directly by the linear return action of the movable extraction sub-assembly as it disengages.

8. Module according to claim 7, wherein the holding and positioning means is unlocked at the end of linear return travel of the second extraction sub-assembly.

9. Module according to claim 4, wherein the ejection means are configured so as to eject the capsule out of the module in a direction other than the direction of insertion.

10. Module according to claim 4, wherein the ejection means are elastically tensioned when the two extraction sub-assemblies are closed and freed from their elastic tension to cause ejection when the two sub-assemblies are reopened.

11. Module according to claim 2, wherein the movable extraction sub-assembly has a linear actuation means of the piston type, which can be activated in closure by hydraulic or electric means.

12. Module according to claim 2, wherein the first extraction sub-assembly is fixed.

13. Module according to claim 9, wherein the ejection means are configured so as to eject the capsule out of the module in an opposite direction to that of the insertion.

14. Extraction module according to claim 2, comprising a body to which the base of the first extraction sub-assembly is fixed, the means for holding and positioning the capsule comprising fingers that engage grooves in the body.

15. Extraction module according to claim 14, comprising springs connecting the fingers to upper ends of the grooves.

16. Extraction module according to claim 3, wherein the cylindrical portion of the means for holding and positioning the capsule encircles a circumference of between 100 and 180 degrees of the opening space.

17. Extraction module according to claim 4, wherein the capsule ejection means is a lever comprising a ring portion.

18. Extraction module according to claim 4, comprising a pin rotatably connecting an end of the capsule ejection means to the base of the first extraction sub-assembly.

19. Extraction module according to claim 4, wherein the capsule ejection means are housed in a recess in the means for holding and positioning the capsule when the capsule ejection means is in a resting position.

* * * * *